(12) United States Patent
Rampata

(10) Patent No.: US 8,863,006 B2
(45) Date of Patent: Oct. 14, 2014

(54) INTER-SERVICE APPLICATIONS

(75) Inventor: Brett Rampata, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 869 days.

(21) Appl. No.: 12/486,280

(22) Filed: Jun. 17, 2009

(65) Prior Publication Data

US 2014/0033064 A1    Jan. 30, 2014

(51) Int. Cl.
*G06F 3/00* (2006.01)
*G06Q 50/00* (2012.01)

(52) U.S. Cl.
CPC . *G06Q 50/01* (2013.01); *G06F 3/00* (2013.01)
USPC ......................................................... 715/747

(58) Field of Classification Search
CPC ......... G06Q 50/01; G06F 3/00; G06F 9/4433; G06F 3/0481; H04L 29/08072
USPC ......................................................... 715/747
See application file for complete search history.

(56) References Cited

U.S. PATENT DOCUMENTS

| | | | |
|---|---|---|---|
| 5,515,492 A * | 5/1996 | Li et al. | 715/744 |
| 6,191,807 B1 * | 2/2001 | Hamada et al. | 348/14.07 |
| 7,159,186 B2 * | 1/2007 | Mattila et al. | 715/769 |
| 2003/0148254 A1 * | 8/2003 | Arzu | 434/322 |
| 2005/0261929 A1 * | 11/2005 | Hansen et al. | 705/1 |
| 2006/0047816 A1 * | 3/2006 | Lawton et al. | 709/227 |
| 2007/0296805 A1 * | 12/2007 | Tedenvall et al. | 348/14.01 |
| 2008/0086542 A1 * | 4/2008 | Mukherjee et al. | 709/219 |
| 2008/0133677 A1 * | 6/2008 | Pattabhiraman et al. | 709/206 |
| 2009/0070286 A1 * | 3/2009 | Liss et al. | 707/1 |
| 2009/0300546 A1 * | 12/2009 | Kwok et al. | 715/825 |
| 2010/0231790 A1 * | 9/2010 | Ansari et al. | 348/552 |
| 2010/0257251 A1 * | 10/2010 | Mooring et al. | 709/216 |
| 2011/0145753 A1 * | 6/2011 | Prakash | 715/783 |

\* cited by examiner

*Primary Examiner* — Omar Abdul-Ali
*Assistant Examiner* — Anil Bhargava
(74) *Attorney, Agent, or Firm* — Shook, Hardy & Bacon L.L.P.

(57) ABSTRACT

Methods and apparatus for providing an inter-service application, wherein connections of a network service are accessed to facilitate the transfer of an article to a list of participants. The article is transferred to and displayed on the desktop environment of a participant. In some embodiments, a timer is initiated on the first transfer, whereupon expiration of the timer, a termination sequence is performed. The termination sequence terminates transfer of the article to the participant list and further displays a graphical presentation to the current participant. Additional methods and apparatus are described.

16 Claims, 16 Drawing Sheets

INTER-SERVICE APPLICATIONS

COPYRIGHT

A portion of the disclosure of this document includes material that is subject to copyright protection. The copyright owner has no objection to the facsimile reproduction by anyone, of the patent document or the patent disclosure, as it appears in the Patent and Trademark Office patent files or records, but otherwise reserves all copyright rights whatsoever. The following notice applies to the software, data, and/or screenshots that may be described below and illustrated in the drawings that form a part of this document: Copyright © 2009, Adobe Systems Incorporated. All Rights Reserved.

BACKGROUND

Networked communications and services, such as social network services and professional association services, provide matrices of connections. The information and connections may be organized according to purpose or interest. Each participant's computing device then enables connections to a variety of other participants, applying permissions and access conditions. For example, a participant may allow a first group of "friends" to access personal news or status information, while allowing a second group of "colleagues" to access professional information. Other applications and services may allow interaction between members of a different service. As these services increase in popularity, the flexibility and complexity of these interactions may increase.

BRIEF DESCRIPTION OF THE DRAWINGS

Some embodiments are illustrated by way of example and not limitation in the figures of the accompanying drawings in which.

DETAILED DESCRIPTION

Figure 1:
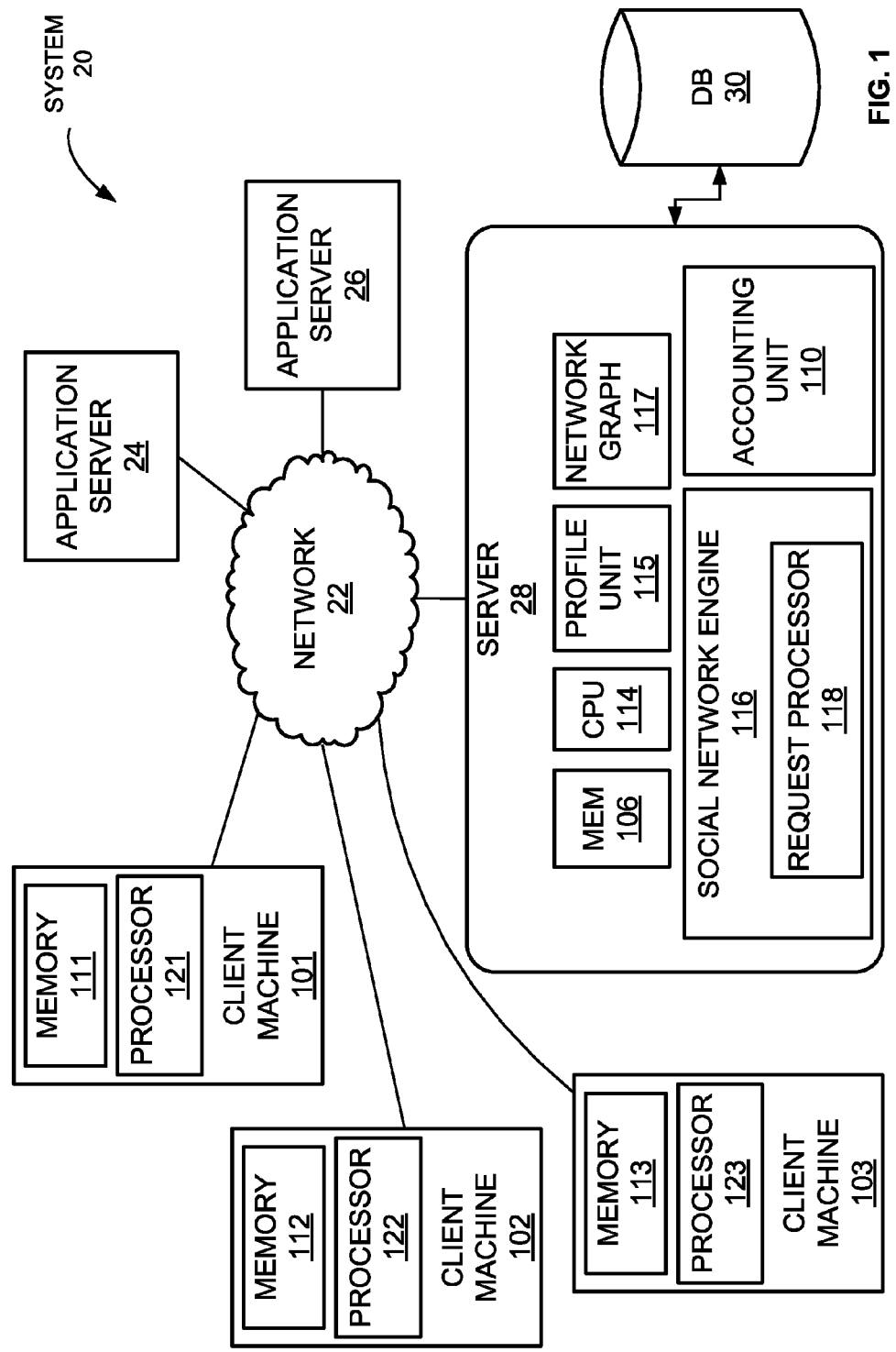
FIG. 1 is a block diagram illustrating a communication system including multiple application servers and client machines communicating through a network, according to an example embodiment.

The following discussion is directed to methods and apparatus for transferring media, assets, and data within a networked communication system, such as for example in a social networking environment. In one example, a participant's computing device enables an application to identify a collection of contacts from a social networking site list. The list may be placed in a desktop display of a computing device to facilitate convenient interaction as part of the application, such as to pass data, assets, or other articles from the one desktop to another. The methods and apparatus discussed are applicable to a variety of networked computing environments, including desktop modules, mobile devices, and other devices.

According to an example embodiment, a participant's computing device within a network service implements an inter-service application. The inter-service application operates over a network and includes multiple participants, where the application accesses target recipients' computing devices through a networked service. In one embodiment the network service comprises a social network service. This allows an originating participant's computing device to reuse contact and other information which has already been stored in the networked service. The inter-service application displays articles and other information on a participant's desktop, and provides for transfer of an article to another participant's desktop display. Each participant's computing device receives the article and displays the article on the participant's desktop. The participant's computing device receives an indication of an action to perform on the article, and in response performs the action.

One example embodiment implements an inter-service transfer of articles as part of a gaming experience similar to a hot-potato game. The originator's computing device enables selection of an article, which in one example is a grenade, to pass to at least one of the originator's list contacts. When the article is passed to a contact, the article is presented for display on the recipient's desktop. A predetermined amount of time is allocated for the article to remain at the recipient's computing device. Other examples may involve other actions with respect to the article, such as actions specific to a game or project, or applying an authorization or signature. The participant's computing device may pass that article to a next participant's computing device, perhaps by acting to virtually toss the article from their screen. Each participant's computing device performs an action on the article, such as to transform the article into a new format, or change a location of the article.

In the hot-potato example, a goal of the game is to pass the article from the recipient's computing device to a next contact's computing device, or back to the originator's computing device, before it explodes. The recipient passes the grenade by tossing it off the screen, such as by dragging the article to the edge of the screen. In this example, the originator's computing device enables selection of a material to fill the grenade, which is then spread over the recipient's desktop on explosion. The originator's computing device further enables selection of a group of contacts for the game. The group is used to form a list of participants, which may be stored and maintained by the network service. As the list of participants is not selected by the recipients, the participants are considered "once-removed" contacts, as they are connected through the originator. The recipients may not have had a prior relationship with participants on the list of participants. In other words, the participants are not necessarily contacts of the recipients.

In one application, the article is passed from an originator's computing device to a participant's computing device. The participant is an entity identified in an originator's list of contacts, which is referred to as a "once-removed contact" list. The originator's contact list may be: i) maintained on the originator's computing device, ii) stored and maintained in memory by a network service, iii) maintained on a storage medium external to the originator's device, and iv) a combination thereof. In one embodiment, the originator's contact list is generated at the originator's computing device. Once created, the originator's contact list may be displayed on the originator's computing device as alpha-numeric or other graphical characters. The originator's contact list is effectively once-removed from a target recipient's contact list, as the target recipient, or participant, uses the participant's computing device to interact with the originator's contacts rather than the participant's own contacts. The once-removed contact list is not necessarily the same as each participant's individual list of social networking contacts. Each participant then interacts through the participant's computing device with the originator's contact list without requiring a prior relationship. In other words, the originator's contact list may include entities that are not in the participant's contact list. The originator's computing device may implement privacy or other controls to protect information contained within the contact list, so that displayed information may be limited to that information which is publicly-available for participants to the social networking site. In alternate embodiments, the participant's computing device may add contacts from another contact list to the application, such as the hot-potato game.

A social network service can benefit from inter-service applications, as these services tend to be repositories of information related to contacts for participants. Social network services typically have a communication structure which connects individuals or organizations, generally comprising nodes connected by interdependencies. When a participant joins a social network, they input a variety of information, which may include personal, professional or interest specific information. Participant information may be available to other participants within the social network, allowing other members to navigate the network and find other participants.

According to one embodiment, a method includes providing inter-service transfer of items by sending the item from an originating desktop to the desktop of another participant. The transfer may comprise a transfer of media items, assets, data, and other articles or objects to be moved from one application to another. The transfer may occur through a social networking application or context. For example, a service or application supporting inter-service transfers includes identifying participants using a collection of contacts from a participant's social networking sites. The list may be displayed on the participant's desktop display in a variety of ways. Additionally, the participant may interact with the contacts from a desktop application or a display, such as a Heads Up Display (HUD). The method and apparatus enable a participant's computing device to pass or send media items, data, assets, and other articles from the participant's desktop to a desktop or HUD of a target recipient. The participant's desktop refers to the participant's computing interface, and may be implemented on a Personal Computer (PC), Personal Digital Assistant (PDA), mobile device or other computing device capable of networked communications. The target recipient then receives the item on the desktop of their computing device. The recipient views the item on the desktop, and is able to pass the item to another participant's computing device. In one embodiment, the recipient's computing device is restricted to passing the item to a contact on the originator's contact list. In another embodiment, the recipient is able to include additional contacts.

The methods and apparatus discussed herein are applicable in a variety of environments, including entertainment, personal use, business processes and others. The originator's computing device enables access to the participant's computing devices through a networking application, such as a social network service. Various constraints and restrictions may be implemented to maintain participant privacy. In one example, the information displayed in the recipients' HUDs is limited to publicly-available information from the networking application. This allows interaction and exchange of articles with previously unknown contacts, and may allow for the creation of new relationships.

Inter-service applications may be implemented in a variety of environments. In one example, the article is a document for review by multiple entities in a business environment. The article is passed through a sequential list of contacts, where each contact has a backup contact in the absence of, or in lieu of the primary contact. In another example, the article is a portion of a collaborative document that is processed through multiple authors, wherein the article is sent to participants' desktops for additions, deletions or comments. There may be a time out period applied, such that if no action is taken on the article, the article is automatically passed to another participant's computing device. This facilitates efficient approval processes, and avoids bottleneck issues created when the process is waiting for a single participant.

FIG. 1 is a block diagram illustrating a communication system including multiple application servers and client machines communicating through a network, according to an example embodiment. As illustrated in FIG. 1, a system 20 has an application server 24, application server 26, multiple client machines 101, 102 and 103, and server 28 to implement a social network of participants. Communications are processed through network 22, which may comprise the Internet or other networked environment. Client machines 101, 102, and 103, include memory storage units 111, 112, and 113, as well as processors 121, 122, and 123, respectively. The server 28 includes a Central Processor Unit (CPU) 114, memory 106, profile unit 115, network graph 117, accounting unit 110, and social network engine 116.

As illustrated, the social network engine 116 includes a request processor 118 to receive inputs at a participant's computing device. The request processor 118 may receive requests to input information into the social network service and database, as well as to retrieve information from the social network service and database. The server 28 implements a social network service and application. The various modules within server 28 may be implemented in alternate configurations, and the server 28 may include other modules for implementing functions and applications with the social network service and application.

As illustrated in FIG. 1, the profile unit 115 is used to maintain participant information, including participant personal information, participant professional information, participant preferences, participant status information, and so forth. Each participant has a corresponding page or website that displays this information. For example, when others access the participant's information, the participant's page may be displayed, including status and news portions. The status provides current information about the participant in a conversational and easy-to-read format. News may be implemented as a feed to keep track of events in a social network. The feed may update periodically throughout the day, or may be updated daily or weekly. The participant profile 115 contains attributes of individuals or entities associated with a social network.

The network graph 117 describes the interconnections among the nodes of the social network. The network graph 117, in one embodiment, is a directed graph containing a large collection of information relating to various individuals in the social network as well as the relationships between those individuals. The network graph 117 may be implemented as a data-structure, such as a relational database, an eXtensible Markup Language (XML) based database, and so forth. The network graph 117 is used to functionally represent intra-relationships between subsets of individuals or groups in the social network.

Data relating to the social network and the individuals who are part of the social network is stored in database 30. Database 30 may be a relational database, or other type of database, depending on the organization of the social network. Other applications are available through network 22, including application server 24.

Figure 2:
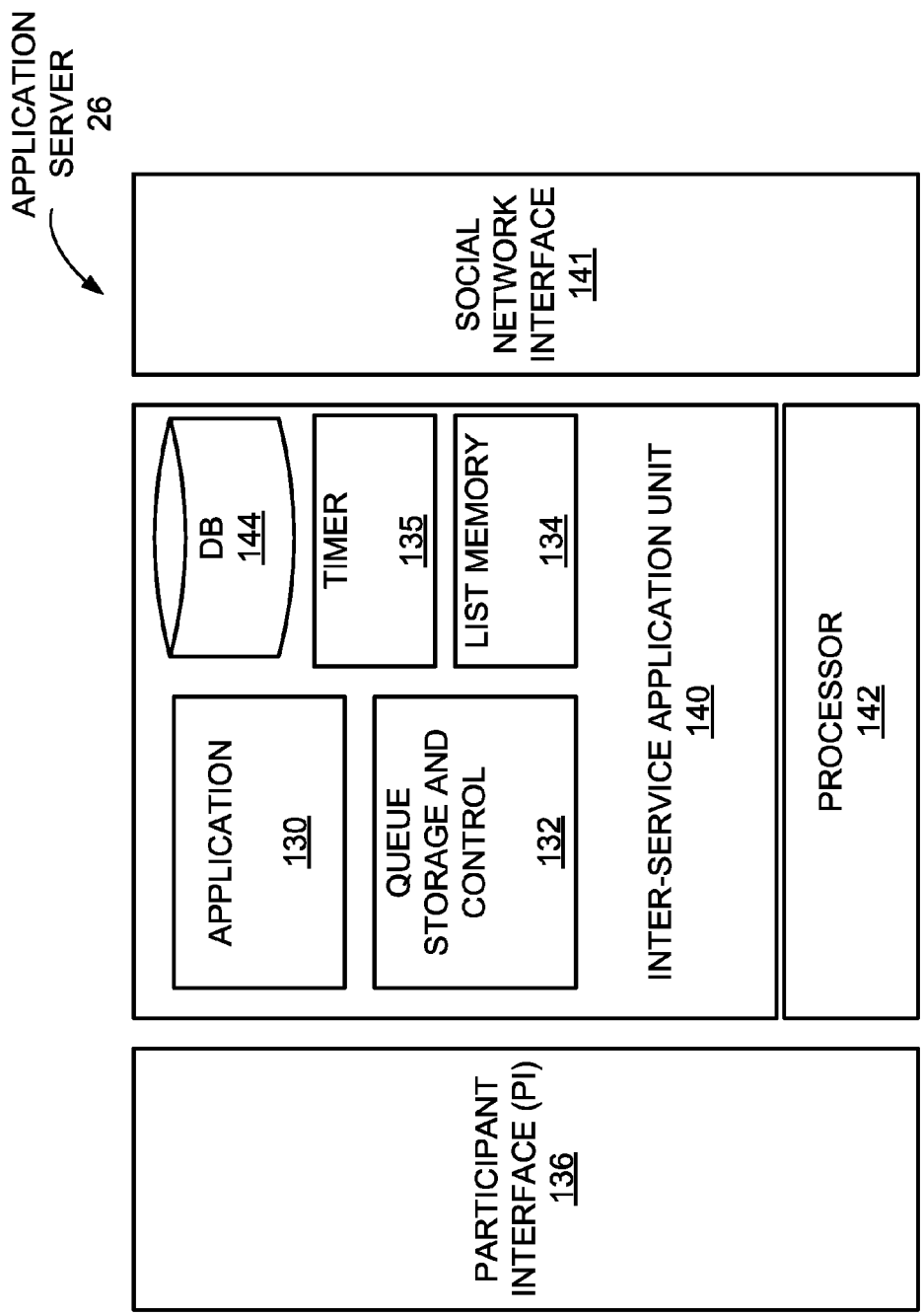
FIG. 2 is a block diagram illustrating an application server supporting inter-service applications, according to an example embodiment.

Application server 26 of FIG. 1 is further detailed in FIG. 2, which is a block diagram illustrating an application server supporting inter-service applications, according to an example embodiment. Application server 26 includes a processor 142, inter-service application unit 140, a graphical Participant Interface (PI) 136 and a social network interface 141. The inter-service application unit 140 includes application 130 to implement inter-service transfers as described herein. Further, inter-service application unit 140 includes queue storage and control 132, a local database 144, and list memory 134. The queue storage and control 132 maintains the order of entities in a participant list, as well as storing historical information as to the participants' activities. Further, the list memory 134 stores lists or groups of participants that have been arranged by participants. The lists or groups stored in the list memory 134 are presented on the participant's desktop display on initiation of the inter-service application, allowing the participant to select an existing group or create a new group. The application server 26 further includes a timer 135, initiated on transfer of the article, and used to maintain an operation time for the activity. For example, the article may be transferred through the list of participants within a specific time period. In another example, the article may be permitted to stay on a participant's computing device for a maximum specified time period.

On initiation of the inter-service application for transfer of an article from a participant's computing device, the participant's computing device sends a request to application server 26, and specifically to inter-service application unit 140 for processing. The requester is the originator, and the originator's computing device may be any of client machines 101, 102 and 103. A client machine 101 is further detailed in FIG. 3.

Figure 3:
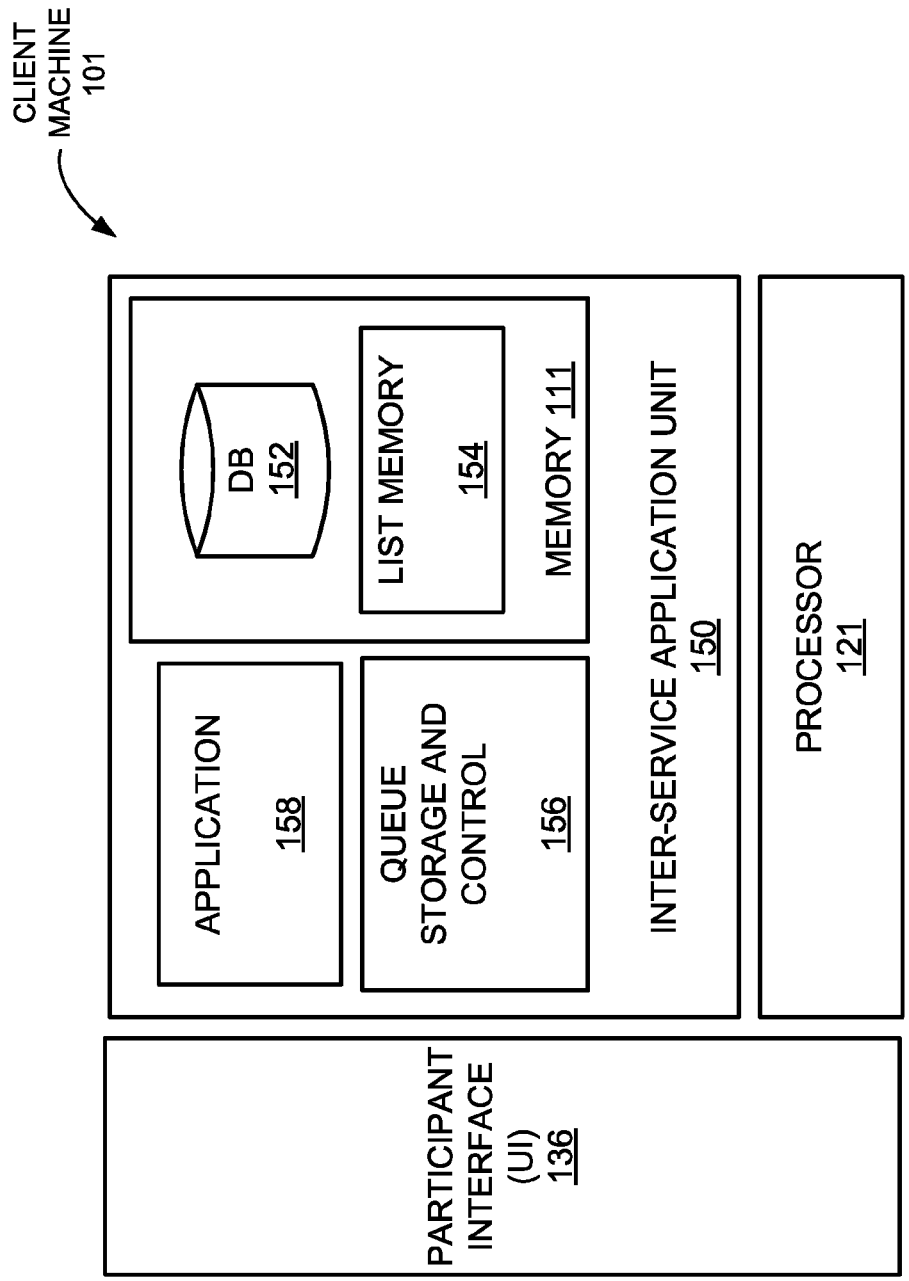
FIG. 3 is a block diagram illustrating a client machine supporting inter-service applications, according to an example embodiment.

FIG. 3 is a block diagram illustrating a client machine 101 supporting inter-service applications, according to an example embodiment. The client machine 101 includes a processor 121, a participant interface 136 and an inter-service application unit 150 specific to the participant. The inter-service application unit 150 may be provided to the client machine 101 by download over an Internet connection, or may be installed directly into the client machine 101, such as by a memory device or disk. The inter-service application unit 150 further includes queue storage and control 156, and memory 111. The memory 111 includes a database 152 and list memory 154.

The inter-service application unit 150 communicates with the inter-service application unit 140 of application server 26 to implement the inter-service transfers. Additionally, the inter-service application unit 150 provides information for displaying the inter-service application as well as tracking the progress of the article through the list. The inter-service application unit 140 may include one or more applications, such as application 158; an application may be implemented as a software module stored in a memory storage unit, as firmware or as an Application Specific Integrated Circuit (ASIC).

The inter-service application allows transfer of an article between desktop environments. In graphical computing, a desktop environment commonly refers to a style of graphical participant interface, or PI, wherein the computing device acts as a desktop for work or other use. The desktop environment typically consists of icons, windows, toolbars, folders, and so forth, which provide a way for entities to interact with the computer in a user-friendly manner.

Figure 4:
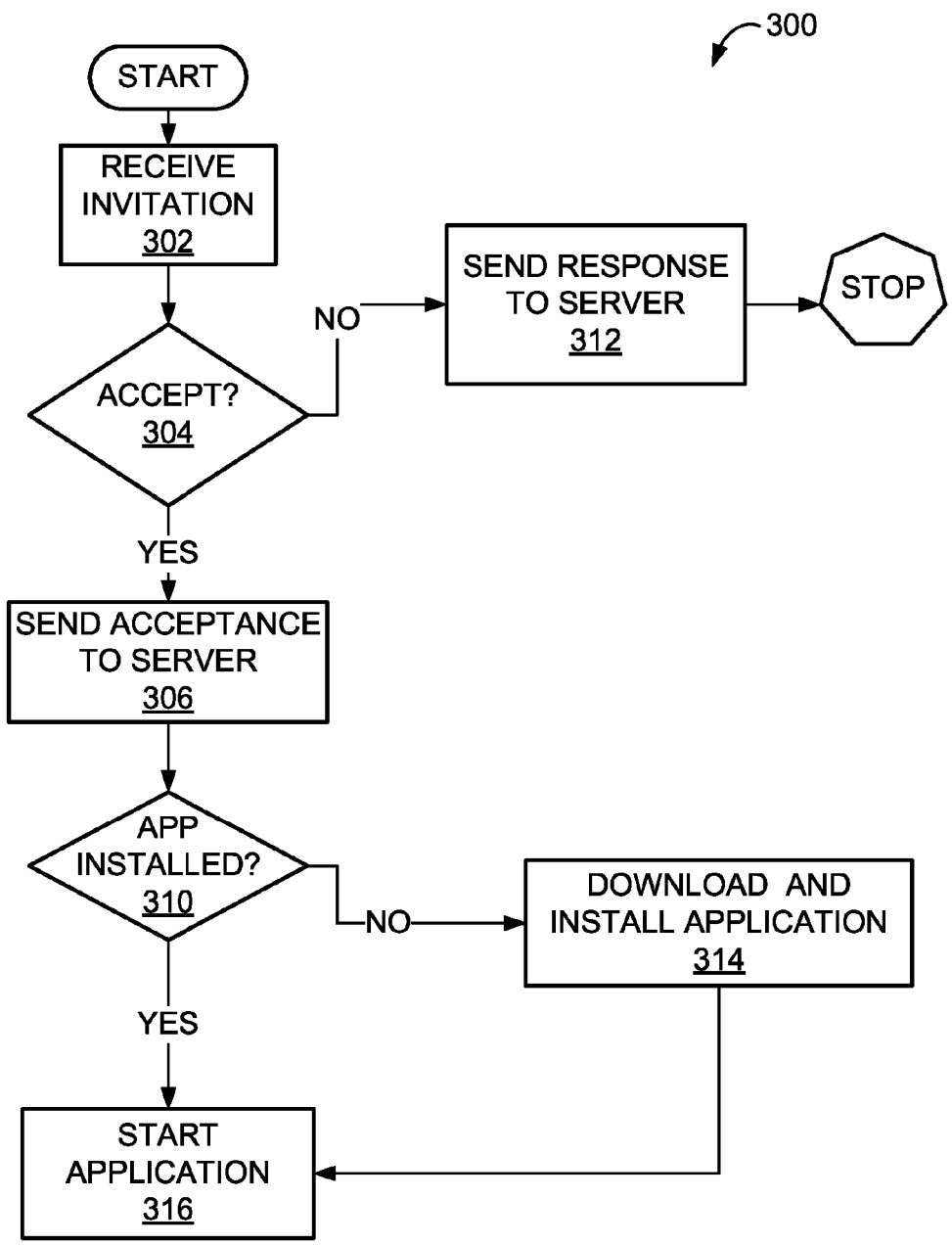
FIGS. 4 and 5 illustrate, in flow diagram formats, a method for operating an inter-service application, according to an example embodiment.

FIG. 4 illustrates, in flow diagram format, a method 300 for operating an inter-service application, according to an example embodiment. The client computing device, such as client machine 101, receives 302 an invitation to join the inter-service application or, in this example, a game. The invitation may comprise a message sent using a messaging protocol, in response to which the recipient either accepts or rejects the invitation. The invitation may include specifics related to the inter-service application or service, such as a time for starting the activity, and so forth. On acceptance 304 the recipient sends 306 an acceptance to the inter-service application unit 140; else the recipient sends 312 a response to the inter-service application unit 140 rejecting the request. In the latter case, the process stops.

On acceptance of the invitation, the method includes determining 310 if the inter-service application is installed. If not installed, the recipient requests a download of the inter-service application for downloading and installation 314 at the computing device used by the recipient. In one embodiment, after installation, the recipient sends a notification to the social network service indicating the inter-service application is currently installed at the recipient's computing device. According to another embodiment, the inter-service application sends such a notification to the social network service for those recipients having the inter-service application installed. Such information may be used to indicate those entities that are interested in such applications. The inter-service application may comprise a game, such as an on-line interactive game. Participants may indicate an interest in such games on their profile, status or news sections within the social network service. For example, a participant may have a webpage associated with their gaming preferences.

Continuing with FIG. 4, after installation 314, the inter-service application starts 316 on the recipient's machine. The participant's desktop may remain unchanged until an article is transferred to the recipient's computing device, or may display an icon indicating the inter-service application is running. In one embodiment, after starting 314 the inter-service application, the list of participants is displayed at the top of the desktop, where the recipient is able to track the transfer of the article among the participants. The article will be transferred from one participant's computing device to another participant's computer device. For example, as displayed on the recipient's desktop, an icon is displayed indicating a current participant having the article may be highlighted. In another application, there is no indication of the inter-service application until the article is transferred to the recipient. In still further applications, the originator's computing device may initiate the transfer of multiple articles, either concurrently or individually, wherein the inter-service application may track the transfers of the multiple articles.

Figure 5:
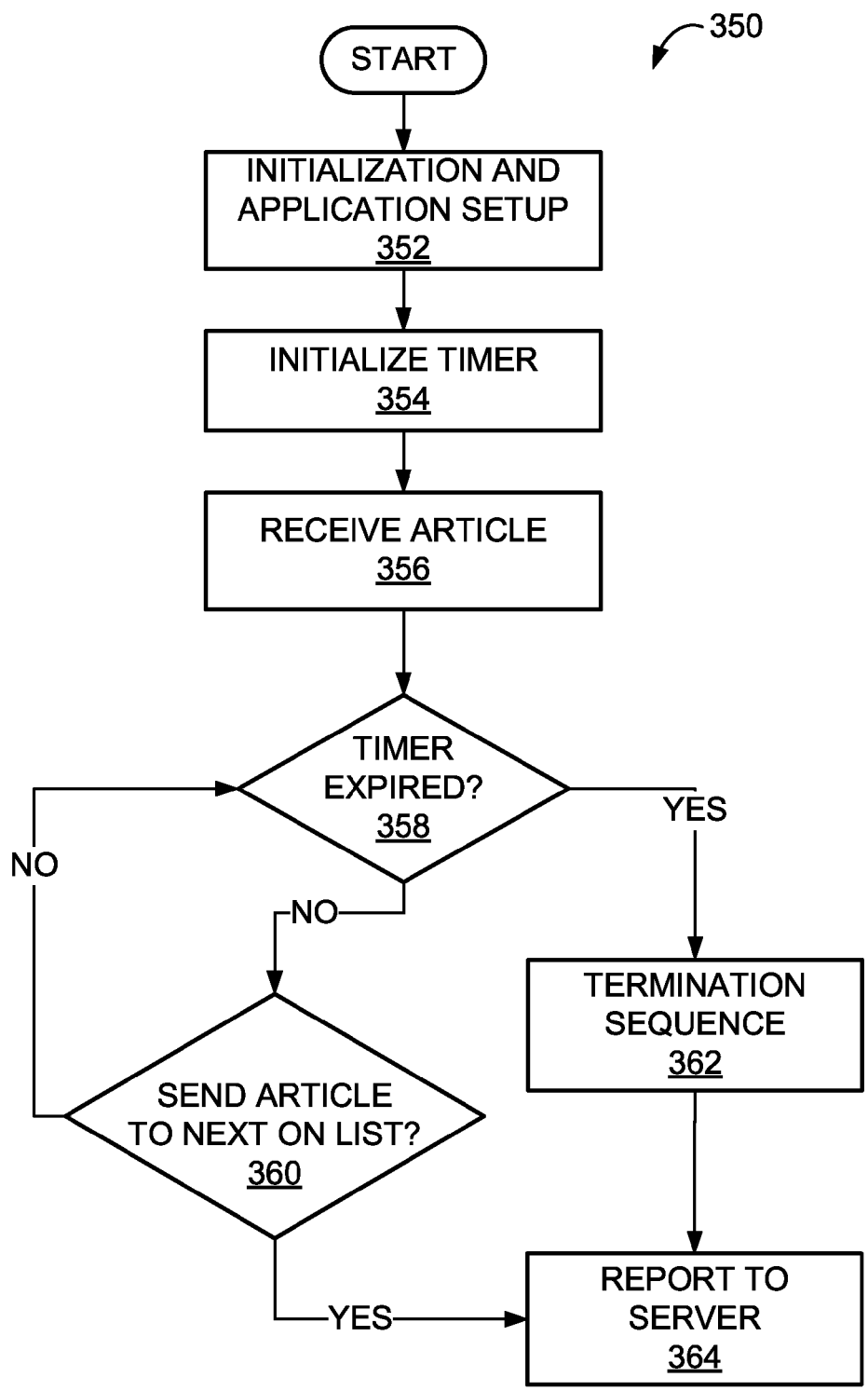

Application start 316 begins with initialization and set up 352, as illustrated in method 350 of FIG. 5. FIG. 5 illustrates, in flow diagram format, a method for operating an inter-service application, according to an example embodiment. According to one embodiment, the recipient's computer device initiates 354 a timer corresponding to the article transfer. In some embodiments, the timer may be initiated by the application server 26. The article is received 356 at the recipient's computing device. At this point, the article appears on the desktop of the recipient's computing device. In one embodiment the article is a grenade or other incendiary device which appears as if thrown onto the desktop. Other representations of articles can be used.

In one embodiment, the recipient is provided with options for handling the article, such as to transfer the article to a specific participant on the list of participants. The recipient may have a choice of next participant, or the recipient's choice of next participant may be restricted to a participant designated by the originator's computing device, such as when the originator's computing device has assigned participants in a specific order. Similarly, the recipient may transfer the article in one of multiple directions, such as to the left side of the desktop or to the right side of the desktop. In one embodiment, the article is to be transferred in a specific direction, and any attempts to transfer in a different direction results in the article returning to the recipient's desktop. For example, in a game where the article is a grenade, moving the grenade to the left side of the desktop will result in the grenade staying on the recipient's desktop as the timer continues to run.

The method includes continuing to check 358 if the timer has expired, and if so, runs 362 a termination sequence. The method 350 includes sending 364 a report to the application server 26. It the timer has not expired, processing continues to determine 360 if the recipient has sent the article to a next participant's computing device. If the recipient has transferred the article, the recipient further sends a report to the application server 26. If the recipient has not yet transferred the article, then the method includes returning to check the timer again.

Figure 6:
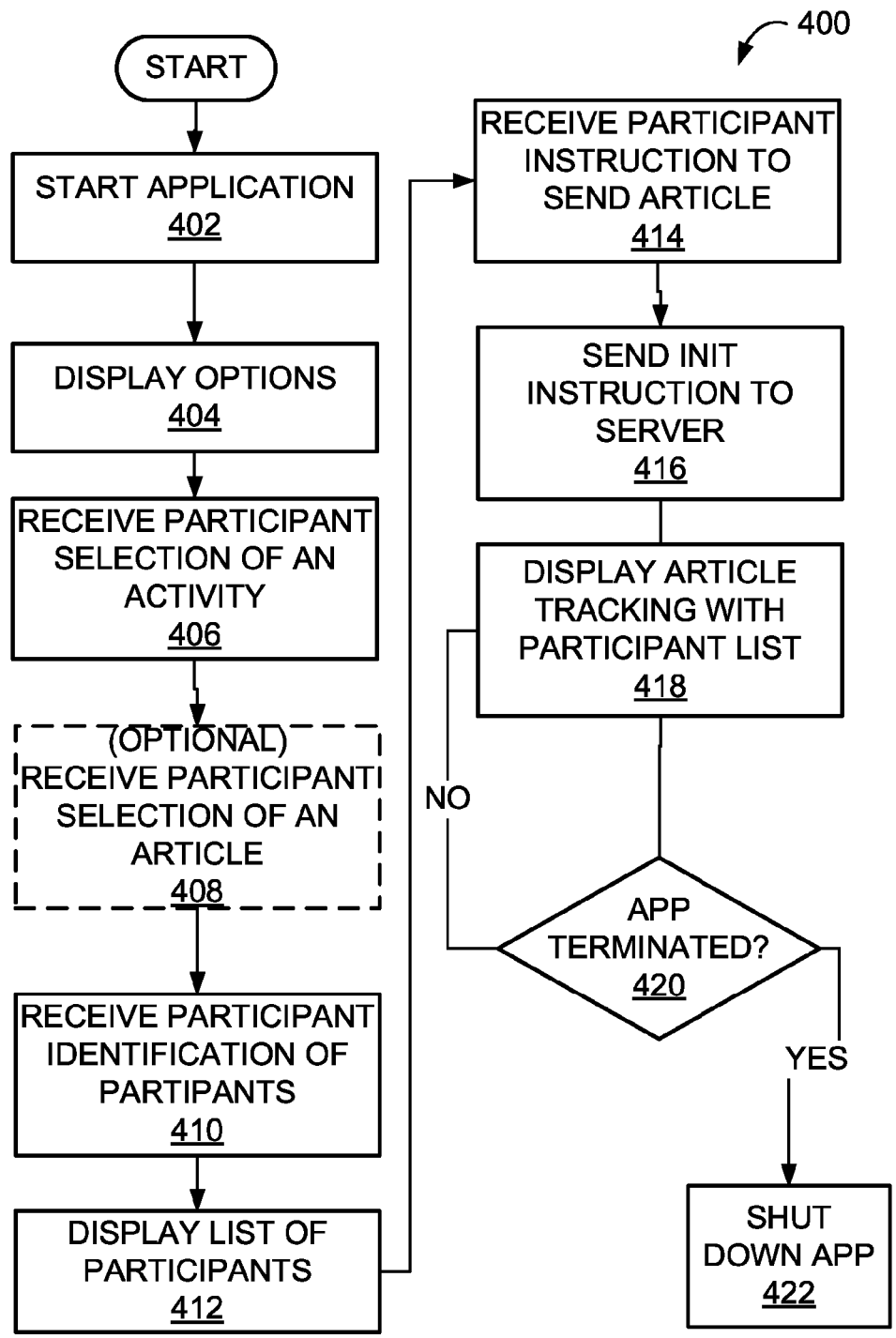
FIG. 6 illustrates, in flow diagram format, a method for initiating an inter-service application, according to an example embodiment.

The article transfer is initiated by an originator's computing device. An example embodiment method 400 for originating an article transfer is illustrated in FIG. 6, in flow diagram format, comprising a method for initiating an inter-service application, according to an example embodiment. The originator's computing device starts 402 the inter-service application, which displays 404 options on the originator's desktop. The inter-service application may present options to the participant to i) select a participant; ii) select a participant list; ii) select an activity; and iv) select parameters of the application. The activity may be an article transfer application. Alternatively, the activity may involve sending information to another participant's desktop, such as for business notifications, documents for signature, or activity requests, where each of the participants are connected through a social network or other networked service.

Continuing with FIG. 6, the originator's computing device receives 406 selection of an activity and optionally receives 408 selection of an article. A given inter-service application may designate the article, where there is no option presented on the participant's computing device. The originator's computing device further receives 410 an indication of the participants for the list. In one embodiment, the originator's computing device has access to previous lists of participants, and is able to select one of the lists. The method 400 then displays 412 the selected options on the originator's desktop, such as the list of participants. In an example embodiment, an icon or photo for each of the participants on the list of participants is displayed on the originators desktop, allowing the originator's computing device to track the travel of the article.

In response to receiving 414 the instruction to transfer the article from the originator's computing device, the inter-service application sends 416 an initialization instruction or request to the application server 26. The desktop display of the originator's computing device then displays 418 information associated with the inter-service application, such as the participant list and tracking of the article as transferred through participants' computing devices. When the application has terminated 420, such as on expiration of the timer, the originator's computing device shuts down 422 the inter-service application and sends a report to the application server 26.

Figure 7:
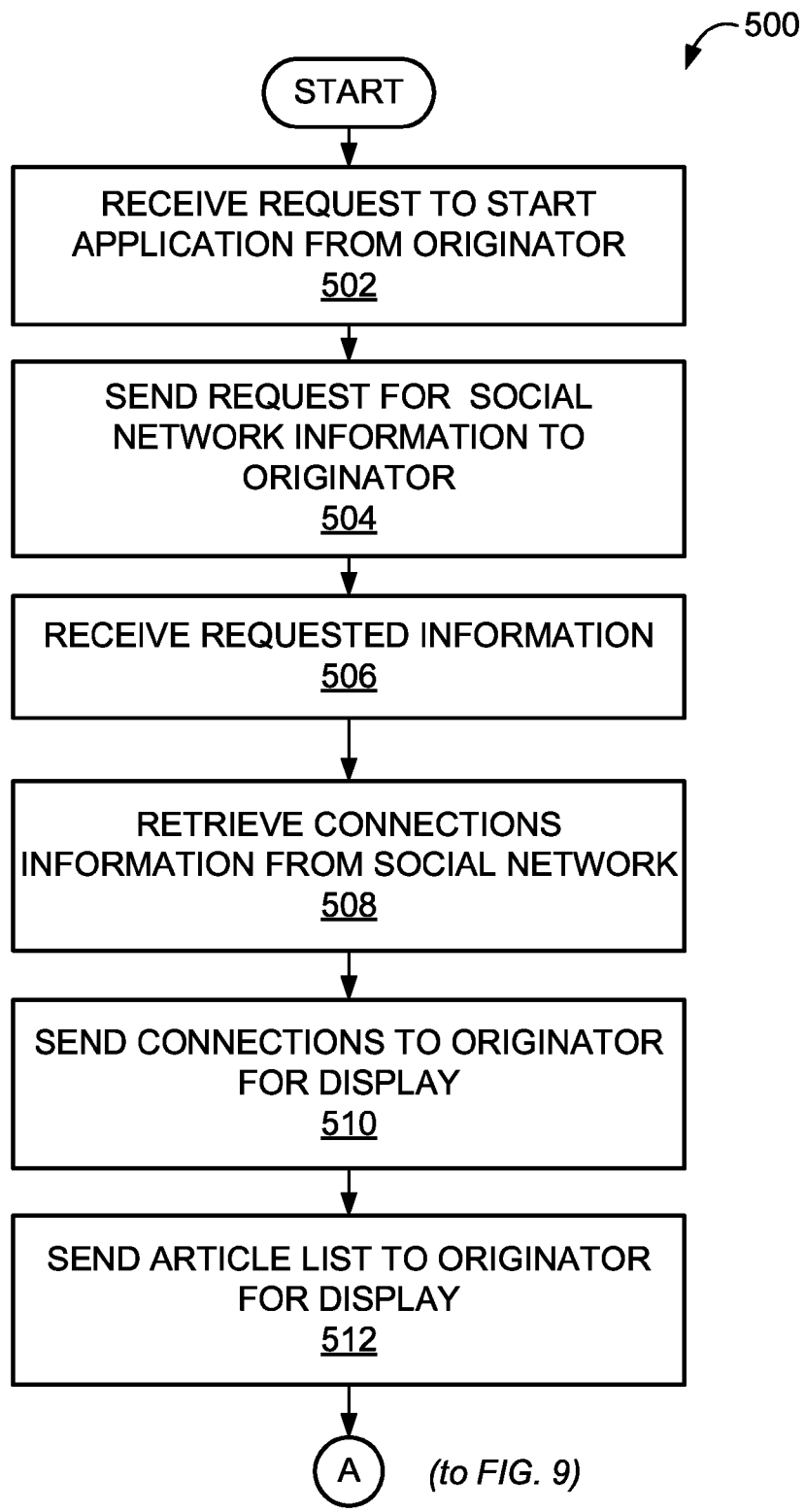
FIGS. 7 to 9 illustrate, in flow diagram formats, a method for implementing an inter-service application, according to an example embodiment.

The originator's computing device includes application code to enable the inter-service application, and may include code for displaying the status and other tracking information as the article passes through the participants' computing devices. Additionally, each participant's computing device includes application code to enable the inter-service application, which may also include code for displaying the status and other tracking information as the article passes through the participants' computing devices. The originator's computing device has application code corresponding to their performance in operation of the inter-service application. The application server 26 contains complementary application code to operate in coordination with the originator and the participant computing devices. FIG. 7 illustrates, in flow diagram format, a method for implementing an inter-service application, according to an example embodiment. As illustrated, a method 500 performed at the application server 26 receives 502 a request to start the application. The request may be received from the originator's computing device. In response, the application server 26 sends 504 a request for social network information to the originator's computing device, and receives 506 the information from the. The application server 26 then retrieves 508 connections information from the social network. The connections information is sent 510 to the originator's computing device and the article information is sent 512 to the originator's computing device for display on the originator's desktop.

Figure 8:
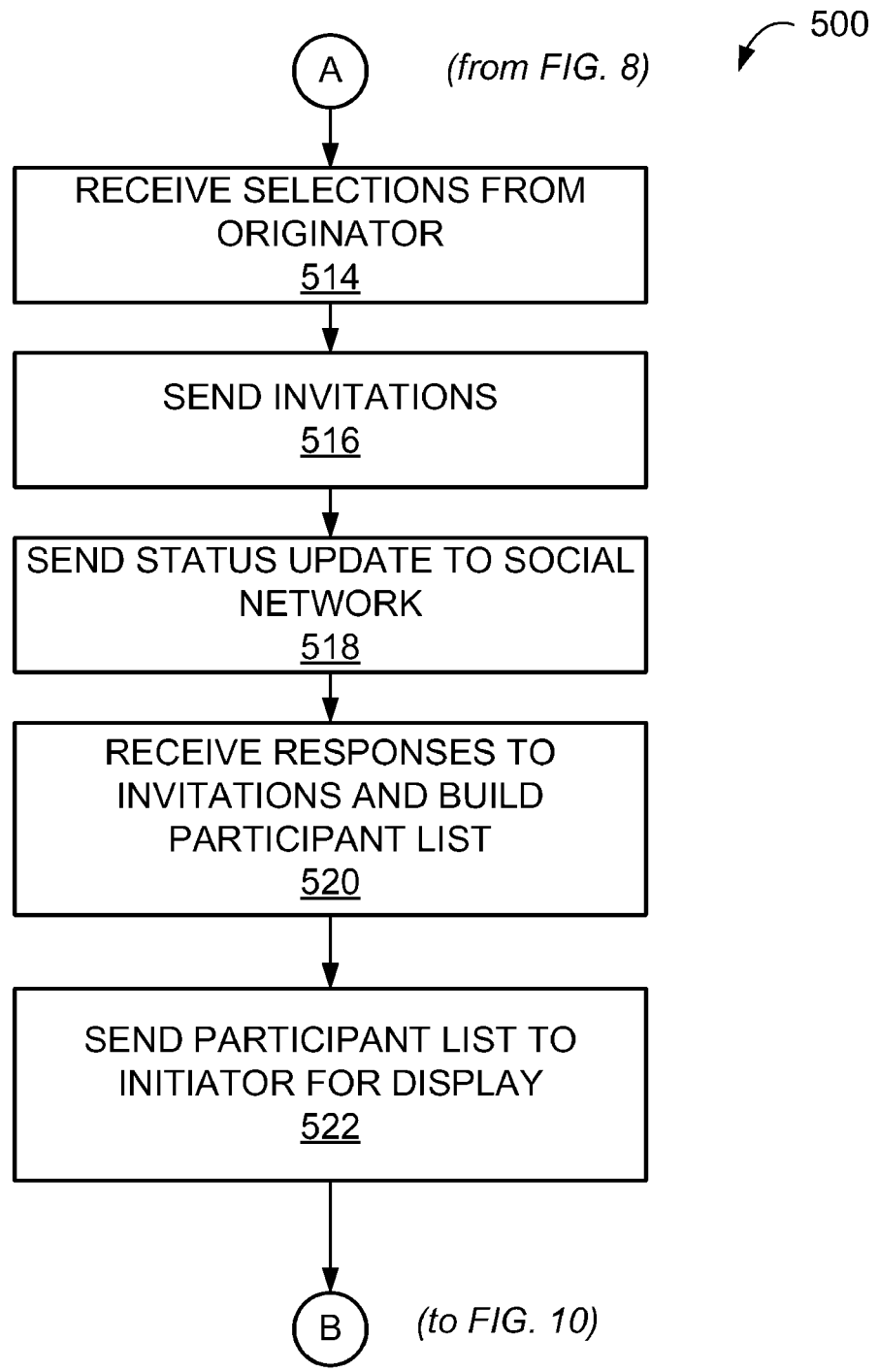

Processing then continues to FIG. 8, which illustrates, in flow diagram format, a method for implementing an inter-service application, according to an example embodiment. As illustrated, selections are received 514 from the originator's computing device specifying the activity, an invitation list of potential participants, and the article specifics. The application server 26 then sends 516 invitations to the potential participants, and sends 518 status updates to the social network for application to the individual participant accounts as well as to any related group accounts. Responses are received 520 and used to build a list of entities that are to be involved in the activity. The application server 26 then sends 522 the participant list to the originator's computing device for display.

Figure 9:
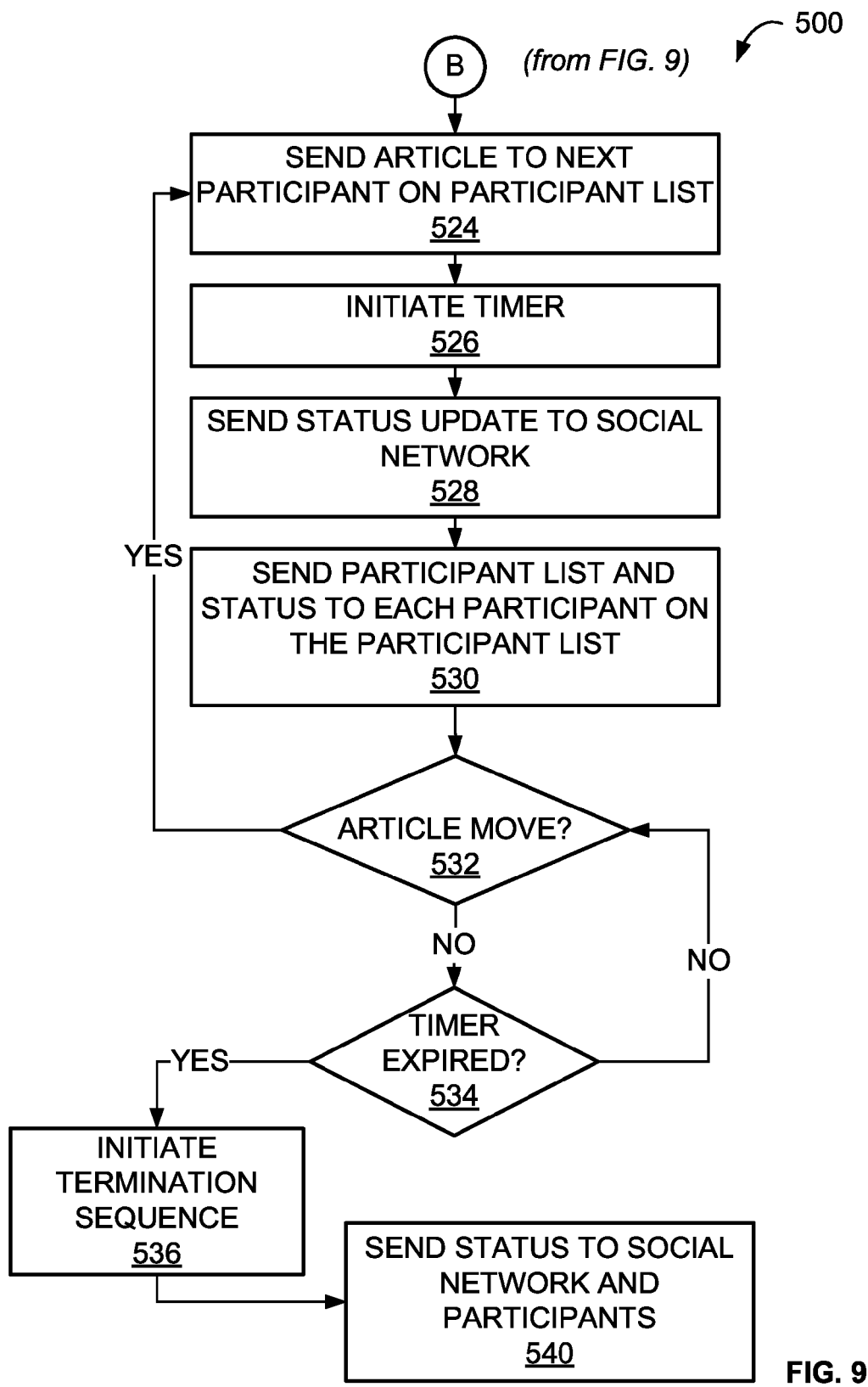

The method continues as in FIG. 9, which illustrates, in flow diagram format, a method for implementing an inter-service application, according to an example embodiment. As illustrated, the application server 26 processes 524 the transfer of the article from the originator's computing device to the first participant on the participant list. A timer is initiated 526 to monitor the transfer of the article. The application server may operate to maintain the timer for the transfer of the article through the participant list. In one embodiment, the timer is used to determine an expiration period for the article. In other words, the article is to transfer among participants' computing devices, and then a termination sequence occurs to the participant's computing device holding the article on termination. In an alternate embodiment, a local timer is used at each participant's computing device, wherein the total expiration time period is the sum of the individual time periods. In this way, if a participant's computing device is not connected to the network when the article is transferred to them, the timer effectively halts until that participant's computing device is connected, when the timer is restarted. An alternate embodiment identifies when a participant's computing device is not connected to the network and skips that participant and attempts to transfer the article to the next participant's computing device corresponding to the list. The application server 26 then sends 528 a status report to the social network. Such reporting allows posting of information relating to participants of the activity on the social networking application. The application server 26 then sends 530 the participant list and current status of the activity to each participant's computing device. The method includes checking if the current participant's computing device has moved 532 the article to a next participant's computing device, and if so, then the application server 26 processes 524 the article for transfer to the next participant's computing device. If the article has not moved, the method 500 includes determining 534 if the timer has expired. When the timer has not expired, the method includes returning to determine 532 if the article has moved. When the timer has expired, processing then initiates 536 a termination sequence for the article, and sends 540 status information to the social network and individual participants on the participant list. The termination sequence may be specific to each activity.

For example, in the hot-potato game mentioned above the article may appear to explode or disintegrate. In other activities using alternate articles, the termination sequence may trigger an alert or message to at least one of the participants' computing device. For example, in a business application, wherein the activity is for approval of a purchase order or other documentation, the article comprises the document, which is passed throughout a group of participants' computing devices for signature. The document is of a high priority and is to be sent through the participant list within a specific time period. On expiration of the timer, a termination sequence flashes an alert to the current participant's desktop. A variety of other scenarios, including activities, articles and termination sequences are contemplated.

Figure 10:
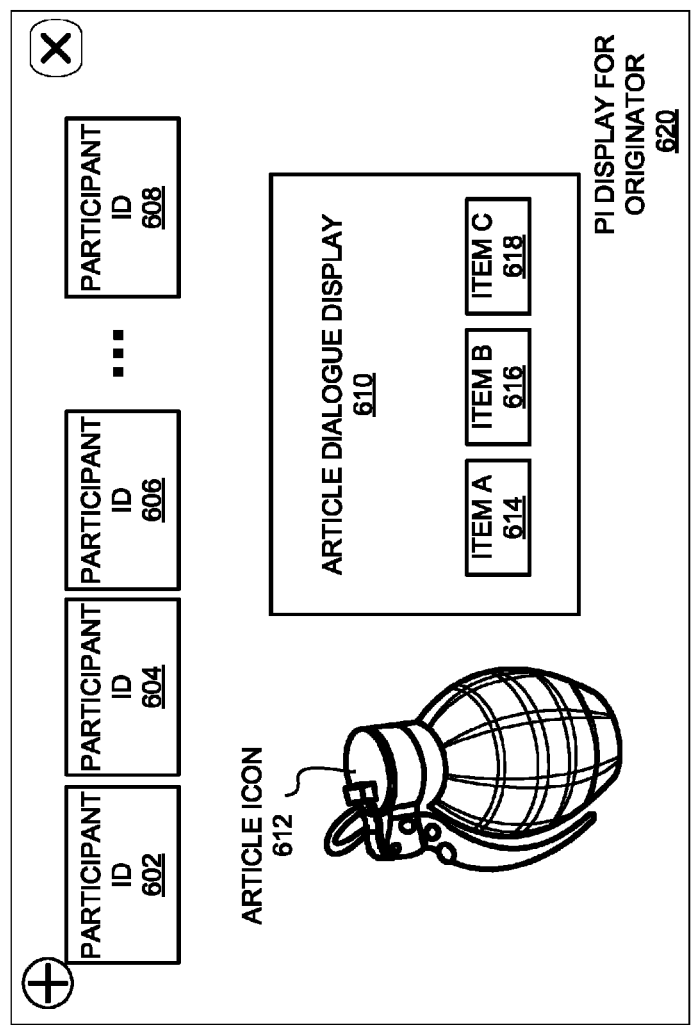
FIGS. 10 to 12 illustrate graphical participant interface displays associated with an inter-service application, according to an example embodiment.

During performance of the activity, various displays are presented to the computing devices of the originator and the participants. FIG. 10 illustrates a graphical participant interface display associated with an inter-service application, according to an example embodiment. As illustrated, a graphical participant interface 620 to be displayed at the originator's desktop. The graphical participant interface 620 displays an article dialogue display 610 for selection of specifics related to a transfer article for the current activity. Each of items 614, 616 and 618 corresponds to a feature for a currently selected article 612, which is displayed next to the article dialogue display 610. The illustrated example has selected a grenade as article 612. The originator's computing device then enables selection of a fill material for the grenade. In this way, a termination sequence will appear to spray the fill material across a participant's desktop. As illustrated, a participant list, including participants 602 to 608 has already been built and is displayed across the top of the desktop.

According to an example embodiment, once the feature selection is made for the article 612, such as the fill material, the feature is applied to the article 612.

Figure 11:
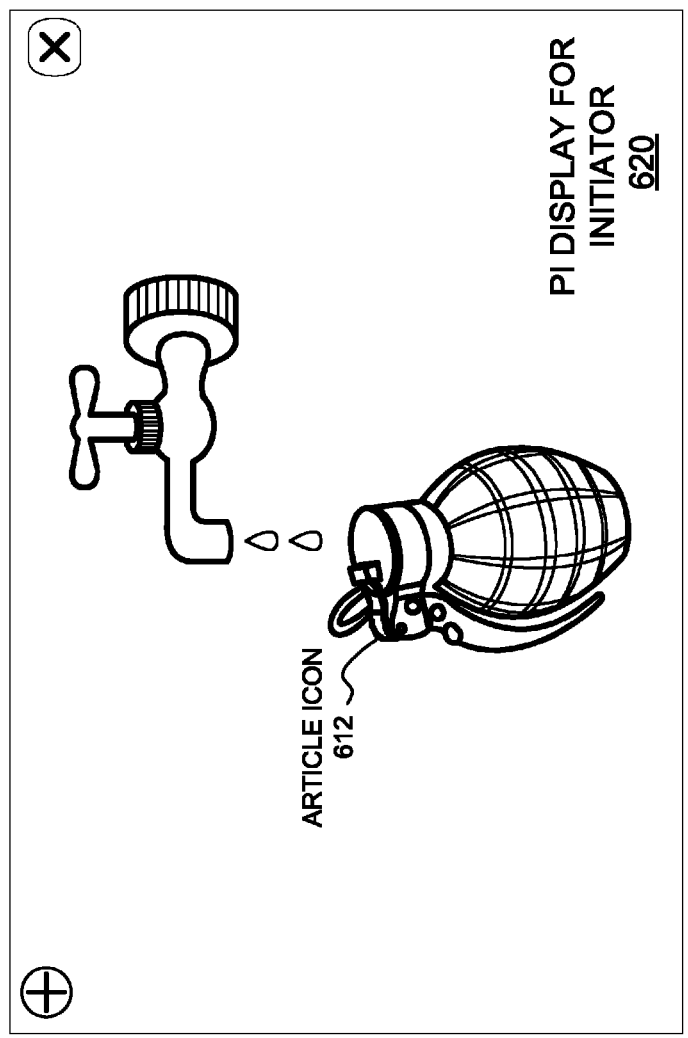

FIG. 11 illustrates a graphical participant interface display associated with an inter-service application, according to an example embodiment. As illustrated, fill material is supplied to the article 612. In this example, the participant interface, PI 620, appears to fill the article 612 with the selected fill material. The originator's computing device is then able to start the transfer of the article 612 to a first participant's computing device. Alternate embodiments may implement other preparatory operations on the article 612, such as to change the shape of the article 612 or place layers on the article 612. For example, the article may be designed by the originator, or may be selected from a group of articles. The articles may be geared at a target audience, such as cartoon characters for groups of children, or gaming avatars for the gaming community, or business icons related to a business group. In one embodiment, the article is a draft of a potential icon or graphic element, such as to represent a business or service, where the participants are each reviewers for approving the design. In one example, a purchase order or other authorization document, is provided to a group of approvers, where each approver has a specified amount of time to respond before the document is forwarded to another approver. Other examples may be implemented for a variety of the user groups, activities, goals or other collaborative efforts.

Figure 12:
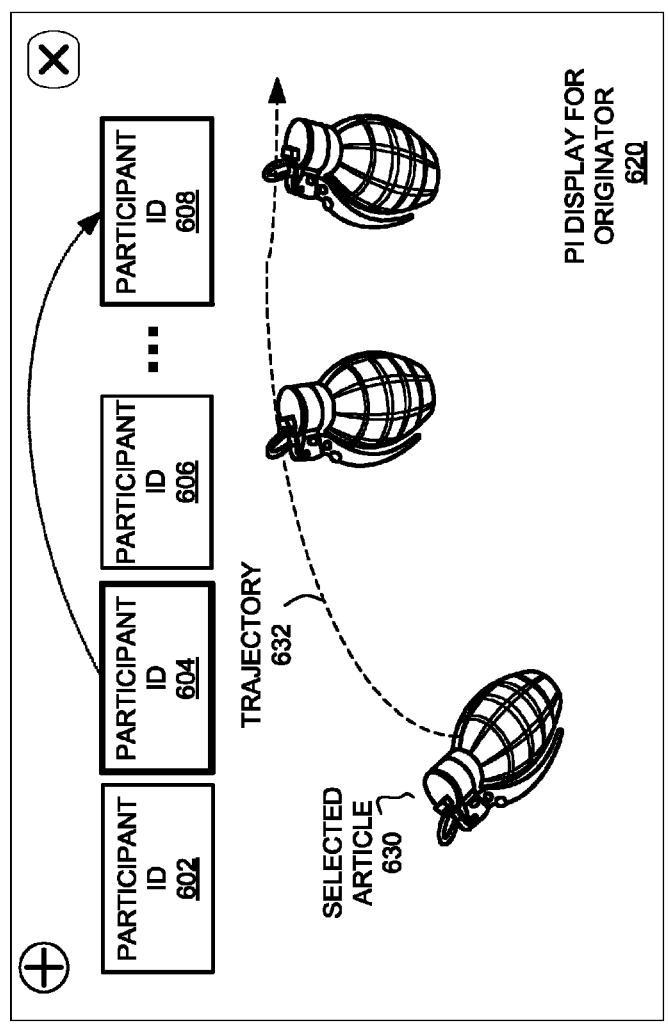

FIG. 12 illustrates a graphical participant interface display associated with an inter-service application, according to an example embodiment. As illustrated, the PI display 620 presents a graphical display of transfers of the article 630 among participants' computing devices, identified as participant identifications (IDs) 602 to 608. As illustrated, the selected article 630 is moved so as to follow a trajectory 632. Once the selected article 630 moves off a participant's desktop, the application server 26 moves the selected article 630 to the next participant's desktop for display along the trajectory 632. As illustrated, the originator's PI display 620 identifies movement of the article among the various participants' computing devices, wherein the current participant's icon is highlighted, the target recipient participant's icon is highlighted, and a directional arrow is displayed showing the relationship from the sender to the recipient. In the illustrated example, participant ID 604 is highlighted. The direction of the article movement is identified by the arrow from participant ID 604 to participant ID 608.

Figure 13:
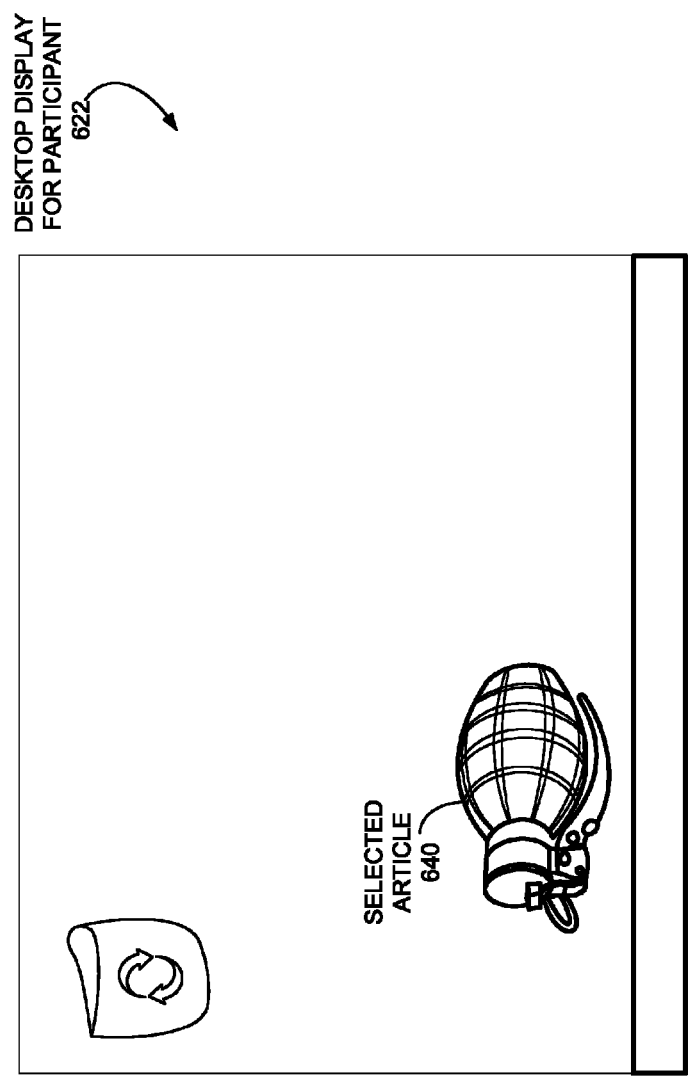
FIGS. 13 and 14 illustrate graphical participant interface displays associated with a participant and an inter-service application, according to an example embodiment.

FIG. 13 illustrates a graphical participant interface display associated with a participant's computing device and an inter-service application, according to an example embodiment. The view illustrates the article 640 as it appears on the desktop display 622, such as at the computing device corresponding to the participant ID 608. As illustrated, the article 640, a grenade, is lobbed onto the desktop display 622 corresponding to the participant ID 608. The graphic and movement associated with an article 640 may be specific to the activity or specified by the originator's computing device.

Figure 14:
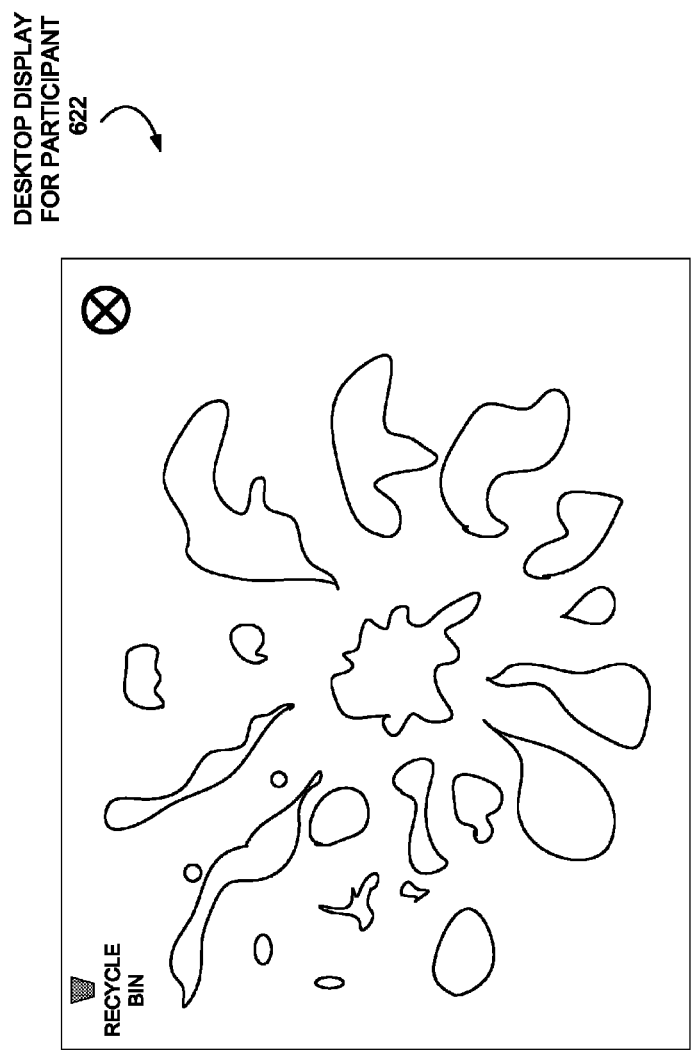

FIG. 14 illustrates a graphical participant interface display associated with a participant's computing device and an inter-service application, according to an example embodiment. As illustrated, a display as a result of the sequence termination, wherein the grenade has exploded and the fill material appears as spread over the participant's desktop. The participant's computing device enables selection of a particular operation and effects for display on timer expiration. In one embodiment, after the termination sequence, actions taken at the participant's computing device may result in various effects. For example, such actions on the participant's desktop after the termination sequence may appear as smearing the fill material of the article 612 across the desktop. Alternatively, the movement of the pointer or cursor over the participant's desktop may result in erasure of the spread fill material. Alternate embodiments may implement a variety of effects.

Figure 15:
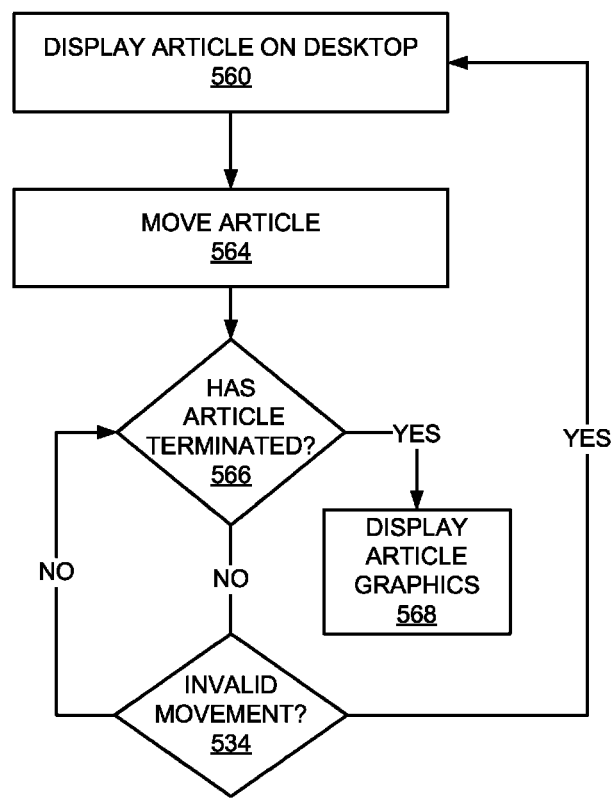
FIG. 15 illustrates, in flow diagram format, a method for processing an article within an inter-service application, according to an example embodiment.

FIG. 15 illustrates, in flow diagram format, a method for processing an article within an inter-service application, according to an example embodiment. FIG. 15 illustrates a method 356 for processing an article at a participant's desktop. The participant's computing device displays 560 the article on the participant's desktop. The participant's computing device moves 564 the article, and checks 566 if the article has terminated or expired. In other words, the time for acting on the article expired. In the hot-potato game example, the article explodes. If so, then the post-termination display graphics are implemented 568. If the article has not terminated, the method 356 includes determining 534 if movement of the article 612 by the participant's computing device is invalid. If the movement is valid, processing returns to check if the article has terminated, else the method 356 includes continuing to display the article on the participant's desktop. An invalid movement may be to move the article 612 off the screen in a prohibited direction. In this way, if an attempt is made to transfer from participant's computing device transfer by such invalid movement, the article 612 remains on the desktop.

In an example embodiment, a computing device receives and processes articles, such as media, data or graphics items, including documents, to perform a specific action, to edit and modify, to provide updates to documents, and so forth. Such methods and apparatus begin with an originator's computing device starting the application, identifying a networked service having connections, building a participant list, and sending an article through the list. In one example, the article is presented to participants via displays, whereupon participant computing devices can be used to transfer the article to other participant computing devices within a specific time period. On expiration of the time period, the article undergoes a termination sequence at the computing device operated by the current participant (the device which currently displays the article on its desktop).

The application server 26 may include various modules communicatively coupled by a communication bus (not shown). Some example embodiments may include remote procedure calls being used to implement one or more of the above-illustrated operations or components across a distributed programming environment. For example, a logic level may reside on a first computer system that is located remotely from a second computer system including an interface level. These first and second computer systems can be configured in a server-client, peer-to-peer, or some other configuration. The various levels can be written using the above-illustrated component design principles and can be written in the same programming language or in different programming languages. Various protocols may be implemented to enable these various levels and the components included therein to communicate regardless of the programming language used to write these components. For example, an operation written in C++ using Common Object Request Broker Architecture (CORBA) or Simple Object Access Protocol (SOAP) can communicate with another remote module written in Java™. Suitable protocols include SOAP, CORBA, and other protocols well-known in the art.

The inter-service application has been described in various examples as providing a desktop presentation which runs separately from desktop applications or web browsers on a computing device. This allows the inter-service application to grab the attention of a user of a computing device, specifically, participants to the inter-service application. Alternate embodiments may be implemented as a web browser application, where a participant's desktop display allows interaction with the article as part of the browser or other networked application. Still further embodiments may include interaction with desktop applications or web browser applications, such as to access functions available in these other applications.

Figure 16:
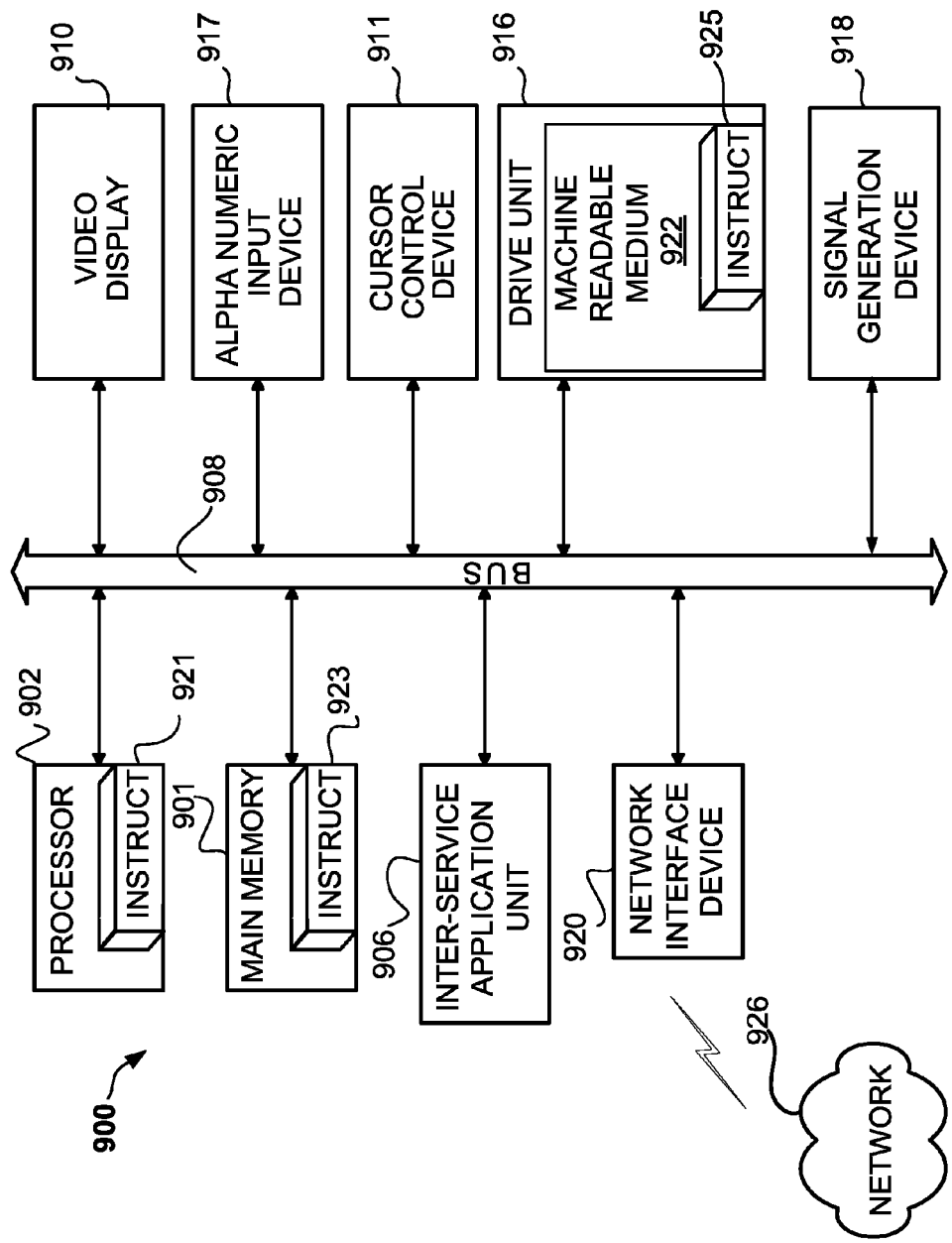
FIG. 16 illustrates a computing environment supporting an inter-service application, according to an example embodiment.

FIG. 16 illustrates a computing environment supporting an inter-service application, according to an example embodiment. As illustrated, a computing system 900 is adapted for operation in a networked computing environment, having at least one machine (not shown) that executes a set of instructions to perform any one or more of the methodologies discussed herein. In some embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may comprise a Personal Computer (PC), a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example, computer system 900 includes a processor 902, such as a Central Processing Unit (CPU), which includes processor instructions 921, a main memory 901, which includes computer-readable instructions 923, and an inter-service application unit 906. The modules illustrated in FIG. 16 communicate with each other via a communication bus 908.

The computer system 900 may further include a video display unit 910 (e.g., a Liquid Crystal Display (LCD) or a Cathode Ray Tube (CRT)). The computer system 900 also includes an alphanumeric input device 917 (e.g., a keyboard), a Participant Interface (PI), a cursor controller 911 (e.g., a mouse), a drive unit 916, a signal generation device 918 (e.g., a speaker) and a network interface device (e.g., a transmitter) 920.

The drive unit 916, which may be disk drive unit, includes a machine-readable medium 922 on which is stored one or more sets of instructions and data structures (e.g., software 925) embodying or used by any one or more of the methodologies or functions described herein. The software instructions 925 may also reside, completely or at least partially, within the main memory 901 and/or within the processor 902 during execution thereof by the computer system 900, the main memory 901 and the processor 902 also constituting machine-readable media.

The software instructions 921 may further be transmitted or received over a network 926 via the network interface device 920 using any one of a number of well-known transfer protocols (e.g., Hyper Text Transfer Protocol (HTTP), Secure Hyper Text Transfer Protocol (HTTPS)).

The inter-service application unit 906 implements the methods and functions described herein. The document control module 930 may be implemented in software, hardware, firmware or a combination thereof.

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, optical and magnetic media. In one embodiment, techniques may be implemented by transmissions on carrier wave signals.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Embodiments may, for example, be implemented as a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels. The one or more processors may also operate to support performance of the relevant operations in a "cloud computing" environment. For example, at least some of the operations may be performed by a group of computers (as examples of machines including processors), these operations being accessible via a network (e.g., the Internet) and via one or more appropriate interfaces (e.g., Application Program Interfaces (APIs).)

In some example embodiments, the system and method as illustrated herein may be used to validate documents, where the authentication of the content of the document and the author of the document may be part of document processing. This document may be, for example, a university transcript, birth certificate, or other suitable document.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

In the detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill in the art have not been described in detail so as not to obscure claimed subject matter.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill in the art have not been described in detail so as not to obscure claimed subject matter.

Some portions of the following detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates and transforms data represented as physical electronic or magnetic quantities within memories, registers, or other information storage devices, transmission devices, or display devices of the computing platform.

Using the methods disclosed herein, web developers are able to build new applications having new interactions by using web development tools resulting in rich web applications and content for the desktop. In one example, the ADOBE AIR application is used to build an inter-service application supporting such content and article transfer. ADOBE® AIR™ has a rich set of features for building applications using a variety of programming languages and formats, such as: Hyper Text Markup Language (HTML); JAVA-SCRIPT™ scripting language by Sun Microsystems Inc., Menlo Park, Calif.; FLEX™ technologies and FLASH® multimedia platform by Adobe Systems Inc., San Jose, Calif., and others.

According to one embodiment, a computer-implemented method involves using at least one processor to receive a request to initiate an inter-service application, the inter-service application enabling transfer of an article through a one or more computing devices, to access a contact list from a network application, to initiate transfer of the article through the group of computing devices according to an order established by the contact list, and to display, on a desktop display, transfer of the article through the group of computing devices. The method may further include displaying a list of set up options, and receiving a selection of at least one option of the list of set up options from an originating participant desktop. In one example, the method further involves sending status information to the network application after transfer of the article to a first computing device of the group of computing devices, wherein the network application is a social network service, and wherein the status information is associated with a first client identifier of the client list, the first client identifier corresponding to the first computing device, wherein the status information is made accessible through the social network service. Still further, the method as may involve retrieving connection information for the client list from the social network service.

In one example, the method of enabling an inter-service application further involves downloading application code to at least one computing device of the group of computing devices, the application code comprising computer executable code for implementing features of the inter-service application at the at least one computing device. The method may use a timer, wherein the method further involves initiating a timer, and on expiration of the timer, perform a termination sequence, wherein transfer of the article through the group of computing devices is terminate, and on expiration of the timer, the article is displayed in a different format. The inter-service application may request feature specifications for the article from an originating participant computing device, receive responses from the originating participant computing device, the responses specifying features for the article, and apply the selected specifying features to the article.

In another example, a system includes an inter-service application, a list memory and a queue storage and control unit. The inter-service application is to access a contact list through a network service and to transfer an article through a group of computing devices according to an order established by the contact list, wherein the article is transferred to a desktop environment for each participant on the contact list for display. The list memory is to store the contact list. The queue storage and control unit is to maintain information relating to the transfer of the article through the group of computing devices, the queue storage and control unit storing the order established by the contact list, the queue storage and control unit is further to track the transfer of the article. The inter-service application may further be to request and receive information from an originating participant computing device, the information used to build the contact list, to select the article and to provide at least one feature selection for the article.

In a further example, a computer-readable medium includes instructions, which when implemented by one or more machines, cause the one or more machines to perform operations including receiving a request to initiate an inter-service application, the inter-service application enabling transfer of an article through a group of computing devices, accessing a contact list from a network application, initiating transfer of the article through the group of computing devices according to an order established by the contact list, and displaying, on a desktop display, transfer of the article through the group of computing devices.

Still another example provides a computer implemented method using at least one processor to select a list of participants for an inter-service application activity, the activity for transferring an article through a list of participants, select the article for transfer, start the inter-service application to transfer the article to participants on the list of participants through a network service, transfer the article through the list of participants such that the article is presented on a desktop display of each participant's computing device, and display the list of participants on a desktop display, wherein transfer of the article through the list of participants is indicated on the desktop display. The computer implemented method may further enable selection at least one feature for the article and of a termination sequence for the article, the termination sequence being to initiate on expiration of a predetermined time period for interaction with the article after transfer to a participant's computing device.

In one embodiment, a computer implemented method uses at least one processor to receive a request to initiate an inter-service application, the inter-service application to transfer an article through a group of computing devices, receive the article, display the article on a desktop display, receive information related to a contact list for a network application, initiate a timer having an expiration time, receive instructions to perform an action on the article, and, prior to the expiration time of the timer, display the action performed on the article and initiate transfer of the article according to an order established by the contact list. The computer implemented method may further download inter-service application code, including computer-readable instructions for implementing the inter-service application, perform a termination sequence upon expiration of the timer, or display article graphics associated with termination sequence. The method may further send status information to the network application after transfer of the article to a first computing device of the group of computing devices.

Some portions of the detailed description are presented in terms of processes, algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

What is claimed is:

1. A computer-implemented method, comprising using at least one processor to:
    receive a request to initiate an inter-service application, the inter-service application enabling transfer of an article via a network to one or more computing devices;
    access a contact list from a network application, the contact list including a plurality of contacts and a specific order of the contacts, the contact list restricting which contacts the article can be transferred to and the specific order describing an order in which the article is transferred to amongst respective computing devices associated with the contacts;
    initiate transfer of the article via the network from a first computing device associated with a first contact to a second computing device associated with a second contact non-adjacent to the first contact in the specific order, wherein the transfer of the article to the second computing device follows a trajectory movement selected by the first contact at the first computing device;
    send data for display, on each electronic display of the respective computing devices associated with the contacts, of the trajectory movement of the article via the network;
    initiate a timer; and
    on expiration of the timer, perform a termination sequence, wherein transfer of the article to the one or more computing devices is terminated and the article is displayed in a different format.

2. The method as in claim 1, further comprising using the at least one processor to:
    display a list of set up options; and
    receive a selection of at least one option of the list of set up options from an originating participant computing device.

3. The method as in claim 1, further comprising using the at least one processor to:
    send status information to the network application after transfer of the article to the second.

4. The method as in claim 3, wherein the network application is a social network service, and wherein the status information is associated with a client identifier of a client list, the client identifier corresponding to the second computing device, wherein the status information is made accessible to the social network service.

5. The method as in claim 4, further comprising using the at least one processor to:
    retrieve connection information for the client list from the social network service, wherein the client list is associated with an originating participant computing device and is once-removed from the one or more computing devices.

6. The method as in claim 1, further comprising using the at least one processor to:
    download application code to at least one computing device of the one or more computing devices, the application code comprising computer executable code for implementing features of the inter-service application at the at least one computing device.

7. The method as in claim 1, further comprising using the at least one processor to:
    request feature specifications for the article from an originating participant computing device;
    receive responses from the originating participant computing device, the responses specifying features for the article; and
    apply the selected specifying features to the article.

8. A system, comprising:
    an inter-service application to (i) access a contact list including a plurality of contacts via a network service, to (ii) restrict transfer of an article via a network amongst respective computing devices associated with the contacts according to a specific order established by the contact list, wherein the article is transferred via the network from a first computing device associated with a first contact to the second computing device associated with a second contact non-adjacent to the first contact in the specific order, wherein the transfer of the article to the second computing device follows a trajectory movement selected by the first contact at the first computing device and to iii) send data for display, on each electronic display of the respective computing devices associated with the contacts, of the trajectory movement of the article via the network;
    at least one processor to initiate a timer and on expiration of the time, perform a termination sequence, wherein transfer of the article to the one or more computing devices is terminated and the article is displayed in a different format;
    a list memory to store the contact list, the contact list including a plurality of contacts and the specific order of the contact;
    a queue storage and control unit to maintain information relating to the transfer of the article via the network to the one or more computing devices, the queue storage and control unit storing the specific order established by the contact list, the queue storage and control unit is further to track the transfer of the article via the network to contacts of the contact list according to the specific order specified in the contact list.

9. The system as in claim 8, wherein the inter-service application is further to request and receive information from an originating participant computing device, the information used to build the contact list, to select the article and to provide at least one feature selection for the article.

10. A non-transitory computer-readable medium comprising instructions, which when implemented by one or more machines, cause the one or more machines to perform the following operations:
    receive a request to initiate an inter-service application, the inter-service application enabling transfer of an article via a network to a one or more computing devices;
    accessing a contact list from a network application, the contact list including a plurality of contacts and specific order of the contacts, the contact list restricting which contacts the article can be transferred to and the specific order describing an order in which the article is transferred amongst respective computing devices associated with the contacts;
    initiating transfer of the article via the network from a first computing device associated with a first contact to a second computing device associated with a second contact non-adjacent to the first contact in the specific order, wherein the transfer of the article to the second computing device follows a trajectory movement selected by the first contact at the first computing device;

sending data for display on each electronic display of the respective computing devices associated with the contacts, of the trajectory movement of the article via the network;

initiate a timer; and on expiration of the timer, performing a termination sequence, wherein transfer of the article to the one or more computing devices is terminated and the article is displayed in a different format.

11. A computer implemented method, comprising, using at least one processor to:

select a list of participants for an inter-service application activity, the activity for transferring an article via a network to a list of participants, the list including a plurality of participants associated with respective computing devices and an order of the participants, the list of participants restricting transfer of the article via the network to participants included in the list and restricting an order of transfer to the specific order of the participants on the list;

select a trajectory movement for transfer of the article from a first computing device associated with a first participant to a second computing device associated with a second participant non-adjacent to the first contact in the order of transfer;

start the inter-service application to transfer the article via the network to the second computing device according to the trajectory movement;

transfer the article via the network to the second computing device according to the trajectory movement such that the trajectory movement of the article is presented on an electronic display of each participant's computing device;

display the list of participants on an electronic display of each participant's computing device, wherein the trajectory movement of the transfer of the article is indicated on the respective electronic displays;

initiate a timer; and on expiration of the timer, perform a termination sequence, wherein transfer of the article to the one or more computing devices is terminated and the article is displayed in a different format.

12. The computer implemented method as in claim 11, further comprising using the at least one processor to select at least one feature for the article.

13. The computer implemented method as in claim 11, further comprising using the at least one processor to select the termination sequence for the article, the termination sequence to initiate on expiration of a timer defining a predetermined time period for the interaction with the article after transfer to a participant's computing device.

14. A computer implemented method, comprising using at least one processor to:

receive a request to initiate an inter-service application, the inter-service application to transfer an article via a network to a one or more computing devices;

receive the article at a first computing device associated with a first contact;

display the article on an electronic display;

receive information related to a contact list for a network application, the contact list including a plurality of contact and a specific order of the contacts, the contact list restricting transfer of the article via the network to only those contacts included in the contacts list and in the specific order of the contacts in the contact list;

initiate a timer having an expiration time;

receive instructions to perform an action on the article;

prior to the expiration time of the timer, (i) display the action performed on the article (ii) receive selection of a trajectory movement for a transfer of the article to a second computing device associated with a second contact non-adjacent to the first contact in the specific order and (iii) initiate transfer of the article via the network to the second computing device according to the trajectory movement;

perform a termination sequence upon expiration of the timer; and display article graphics associated with termination sequence.

15. The computer implemented method as in claim 14, further comprising using the at least one processor to:

download inter-service application code, including computer-readable instructions for implementing the inter-service application.

16. The computer implemented method as in claim 14, further comprising using the at least one processor to:

send status information to the network application after transfer of the article to the second computing device.

* * * * *